United States Patent
Kalekar et al.

(10) Patent No.: US 8,904,117 B1
(45) Date of Patent: Dec. 2, 2014

(54) NON-SHARED WRITE-BACK CACHES IN A CLUSTER ENVIRONMENT

(71) Applicant: Symantec Corporation, Mountain View, CA (US)

(72) Inventors: Santosh Kalekar, Pune (IN); Niranjan S. Pendarkar, Pune (IN); Vipul Jain, Pune (IN); Shailesh Marathe, Pune (IN); Anindya Banerjee, Barrackpore (IN); Rishikesh Bhagwandas Jethwani, Pune (IN)

(73) Assignee: Symantec Corporation, Mountain View, CA (US)

( * ) Notice: Subject to any disclaimer, the term of this patent is extended or adjusted under 35 U.S.C. 154(b) by 165 days.

(21) Appl. No.: 13/723,748

(22) Filed: Dec. 21, 2012

(51) Int. Cl.
*G06F 12/00* (2006.01)
*G06F 12/08* (2006.01)

(52) U.S. Cl.
CPC .................. *G06F 12/0815* (2013.01)
USPC ............ 711/143; 711/119; 711/130; 711/144

(58) Field of Classification Search
None
See application file for complete search history.

(56) References Cited

U.S. PATENT DOCUMENTS 6,044,438 A * 3/2000 Olnowich ..................... 711/130

* cited by examiner

*Primary Examiner* — Shawn X Gu
(74) *Attorney, Agent, or Firm* — Campbell Stephenson LLP (57) ABSTRACT

Various systems and methods for performing write-back caching in a cluster. For example, one method can involve a first node detecting that no failover nodes are available. A determination is made whether the first node should use write-back caching or not. If the first node is to continue using write-back caching, a first local cache identifier and a global cache identifier are both updated.

20 Claims, 6 Drawing Sheets

NON-SHARED WRITE-BACK CACHES IN A CLUSTER ENVIRONMENT

FIELD OF THE INVENTION

This invention relates to computer data storage and, more particularly, to using non-shared write-back caches in a cluster.

DESCRIPTION OF THE RELATED ART

An ever-increasing reliance on information and the computing systems that produce, process, distribute, and maintain such information in its various forms continues to put great demands on techniques for providing information resources and access to those information resources. Many businesses and organizations have a need not only for a significant amount of computing resources, but also for those resources to be available with a minimal amount of downtime. One way to satisfy such needs is an environment in which computing resources are clustered together, thereby providing a flexible, high-performance, and highly available platform to access shared data in a network environment.

A cluster includes a group of nodes configured to provide high-availability. Cluster resources, such as storage devices, are shared between the nodes of the cluster. A typical configuration includes one or more active nodes and one or more failover nodes. An application that is executed on an active node has access to data stored in a shared storage device. If the active node fails, the application is restarted (fails over) to a failover node. The failover node is granted access to the shared storage device and the application continues running on the failover node using the data on the shared storage device.

In order to improve performance, e.g., input/output (I/O) performance of applications, caching can be used. Caching is a technique that uses multiple data storage entities to improve performance. Caching involves storing data that is likely to be used in a more readily accessible, e.g., faster, memory (a cache). This allows access to the data by accessing the cache without accessing the backing store, which is typically less accessible, e.g., slower. There are multiple types of caching, such as write-through caching and write-back caching. Write-back caching involves initially writing data to a cache. The data is not initially written to the backing store. At some later time, the data is written (flushed) from the cache to the backing store. Currently there are multiple caching solutions available for standalone write-through and write-back caching which cannot be implemented in clustering environments.

There are difficulties that can prevent the use of write-back caching presents in a cluster. For example, if write-back caching is used to improve performance of an application executing on an active node, and the active node fails, the data in the cache on the failed active node may not be available to other nodes in the cluster. In this case, if the application is failed over to a failover node, the application may not execute properly due to the unavailability of the data written to the cache on the failed active node. That is, the application, when previously running on the failed active node, may have written updates to data in a cache on the failed active node. If the failed active node was using write-back caching, and had not yet flushed the data from the cache on the failed active node to a shared storage device, the data from the cache is no longer available since the failed active node is down. Thus, even though the cluster enables the application to resume operation on a failover node, the application may experience errors due to the data that was lost when the failed active node went down. In clusters that include a shared storage device as well as multiple nodes that each implement non-shared local caches, each node performs write-back caching using its local cache. Nodes can end up using stale caches in the event of a serial split brain.

In some cases, problems with using write-back caching in a cluster can be addressed by replicating data from the active node's write-back (local, non-shared) cache to write-back (local, non-shared) caches of any failover nodes present in the cluster. However, this technique is also susceptible to errors. For example, if no failover nodes are available, replication is not possible. In another scenario, if the active node goes down while flushing data from the active node's local cache to the shared storage device, errors can result when failover occurs or when additional nodes join the cluster. Furthermore, if a node joins (or rejoins) a cluster and is the only node in the cluster, the node would have no way to know if any data in the node's local cache was valid, e.g., the most current data, or if newer data had been written, e.g., by an application to a local cache on another node or to the shared storage device itself.

Another way to implement write-back caching in a cluster environment is to use a dual port local cache connected to all the nodes of the cluster. On crash recovery, a failed node can access the non-shared local cache for data recovery. However, this method is limited in effectiveness in that in order for this method to work, all the nodes of the cluster would need to be connected and their membership could not be dynamically altered. Thus, in the case of a split brain, stale caches could still be used.

Therefore, what is desirable is to achieve the performance benefits of using write-back caching in cluster environment, without incurring the risk of errors resulting from the difficulties of integrating write-back caching and cluster technologies. A solution should have minimal (if any) effect on failover time during graceful switchover from an active node to a failover node. In case of a node crash or split-brain, write-back cache data should be recoverable, and the solution should have minimal (if any) effect on application online time while write-back cache data recovery is in progress.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

As noted above, the present description describes using write-back caching, which is a technique that can be used to improve computing performance in cluster environments. An example cluster typically includes two (or more) nodes and one or more shared storage devices. Each node in the cluster includes a non-shared (local) cache, such as a solid state drive (SSD). A node performs write-back caching using the local cache. When an application executing on a first node issues an I/O request, such as a read or write request, the operation is completed, when possible, using the first node's local cache. For example, when the application requests that a block be written to address x of the shared storage device, the first node instead writes the block to address y of the first node's local cache, and records the address pair (x,y) in a cache table. The cache table can reside in memory (e.g., RAM on the first node), on the shared storage device, or on the local cache.

To provide high-availability, each such cached block, e.g., each block that has been written, or is a dirty block, is also copied to one or more additional nodes, such as a second node, in the cluster using, for example, a cluster interconnect. The second node stores the block in its own local cache (e.g., at address y'). The source address x is also copied over to the additional node, and the second node inserts an entry (x, y') in its local cache table. In one embodiment, a user, such as an administrator configures the cluster. Configuring the cluster involves setting values for one or more parameters. For example, the user sets a value indicating that the cluster should be able to tolerate two failed nodes. Based on this value, the cluster detects that three copies of the cached block should exist, such that if two nodes fail, the third copy of the cached block is still available. The user can also specify the recovery point objective (RPO) that the cluster should provide (e.g., zero RPO), or that there should be zero time during which data is unavailable due to a node (or site) crash.

If the first node crashes, the second node enables the shared storage device for access, e.g., by applications executing on the second node. The second node also associates the second node's local cache with the shared storage device, using the second node's cache table. If an application executing on the second node requests a read operation that specifies block address x of the shared storage device, the second node will access the second node's cache table, locate the entry (x, y') and fetch the data from address y' of the second node's local cache.

To continue to offer high availability, the data stored in the second node's local cache, e.g., write data, or dirty blocks, should be replicated to another node. That way, if the second node crashes, the data stored in the cache is still available via the another node. If the second node detects that no other nodes are available, the second node can decide whether to continue using write-back caching without high-availability. Alternatively, the second node can flush all data stored in the write-back caching to the shared storage device and disable write-back caching on the local cache.

Flushing all data from the local cache to the shared storage device is known as a cache recovery operation, or cache recovery. Failure of one or more nodes during cache recovery can lead to stale local caches. Comparing an identifier stored in a local cache with an identifier stored in the shared storage device can detect a stale local cache and prevent the use of stale cache data. In one embodiment, the global and local copies of the identifier are set to same value during initialization of the cache. The identifier can be maintained at the granularity of a device or a group of devices or for all devices in the system. In one embodiment, the identifier is incremented when a surviving node will continue using the write back cache after a node crash occurs. However, if the surviving node does not continue using the write back cache, then the surviving node starts flushing the cache and marks the cache as "disabled" when the flush completes. In one embodiment, the state of the cache is maintained in the shared storage. Example states include "disabled," "enabled," and "flushing." While the flushing is in progress, this state will be marked on the shared storage device, so that if the surviving node also crashes, another node in the cluster, or a node that joins subsequent to the crash of the previously surviving node, will not try to enable application writes to the shared storage device. Instead, if a node rejoins the cluster, the node discards the data stored in the local cache. In one embodiment, the "flushing" state can be made more fine-grain so that in some cases the node can detect what data in the node's cache still needs to be flushed to the shared storage device and can enable application access to the shared storage device even though the previously surviving node had not fully flushed its local cache to the shared storage device. For example, the shared storage device can track which particular regions or blocks have been updated, including updates that occurred during the flush as well as other application writes, so that those regions or blocks are not overwritten if the flush resumes. In one embodiment, writes to the shared storage device can be disallowed while the flush is in progress to ensure that data on the shared storage device and data in the local cache are always consistent.

The systems and methods described herein are configured to integrate standalone write-back cache (using non-shared local caches) with clustering. This ensures that application high-availability is provided while also improving I/O performance. Recovery of application data in case of node-crash where the data was cached is also provided for in a manner that minimizes or eliminates impact to the failover time, thus ensuring rapid failover. The methods and systems described herein also ensure correct data usage if a cache recovery operation aborts on a first node and resumes on another node. This methods described herein can also be applied in a non-cluster environments.

Figure 1:
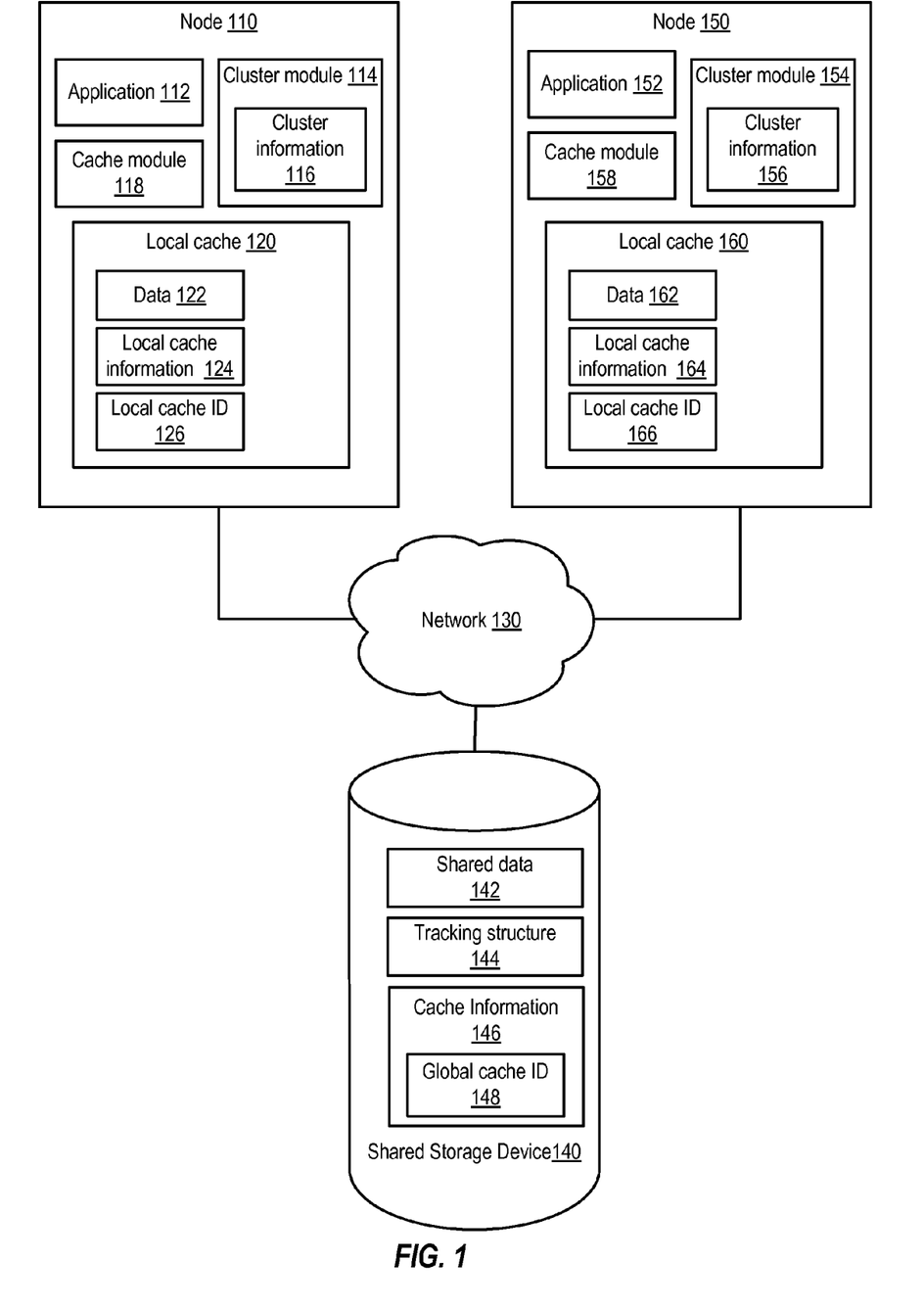
FIG. 1 is a block diagram of a system that can use write-back caching in a cluster environment, according to one embodiment of the present invention.

FIG. 1 is a block diagram of a system configured to utilize write back caching in a cluster environment. As shown, FIG. 1 depicts a cluster including a node 110 and a node 150. While FIG. 1 is shown as having two nodes, it should be understood that more or fewer nodes can be included in the cluster. In one embodiment, one of the nodes is configured as an active node and the other one of the nodes is configured as a failover node. Alternatively, the cluster can include multiple independent active nodes. The cluster of FIG. 1 also includes a shared storage device 140.

Node 110, node 150, and shared storage device 140 are coupled via network 130. Network 130 can include a WAN (Wide Area Network), such as the Internet, one or more LANs (Local Area Networks), and/or one or more SANs (Storage Area Networks). In one embodiment, network 130 can include one or more cluster interconnects that provides a direct, redundant connection between node 110 and node 150. A cluster interconnect is configured to transmit cluster information between the nodes, such as heartbeat information. The cluster information can be used by the nodes to detect cluster information, such as which nodes are present, which nodes are configured as active, and which nodes are available for failover.

Node 110 is a computing device such as a personal computer, laptop computer, server, personal digital assistant, cell phone, or the like. In operation, node 110 executes one or more applications that process data. Node 110 stores the data in shared storage device 140. Node 150 is a computing device such as a personal computer, laptop computer, server, personal digital assistant, cell phone, or the like. Node 150 is configured to take over operations for node 110 in the event that node 110 fails. In one embodiment, node 150 resumes execution of the one or more applications where the execution left off when node 110 failed.

Shared storage device 140 provides persistent data storage, such that data stored on shared storage device 140 will remain stored even after the storage device is powered off. Shared storage device 140 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Shared storage device 140 can also be a virtual or logical storage device that is implemented on such physical storage devices and/or storage systems. For example, shared storage device 140 can be a logical volume that is implemented on a RAID storage system. Additionally, shared storage device 140 can include one or more storage devices. Shared storage device 140 can also include one or more types of storage media, including solid state media (e.g., flash drives), optical media (e.g., CDs and DVDs), and magnetic media (e.g., hard disks or magnetic tape). In some embodiments, shared storage device 140 can be implemented using cloud storage, in which the storage device is a logical storage device to which physical storage device(s) are allocated on an as-needed and/or as-contracted basis.

As shown, shared storage device 140 includes shared data 142, a tracking structure 144, and cache information 146, which includes a global cache identifier 148. Shared storage device is configured to be accessed by one or more nodes in the cluster. Shared data 142 includes data used by one or more applications executing on the nodes of the cluster. For example, shared data 142 can include one or more logical organizations of data, such as files, directories, volumes, and the like. Such logical organizations can be composed of one or more physical organizations of data, such as blocks, extents, tracks, and the like. Data, e.g., a file, in shared data 142 is configured to be accessed, e.g., read and/or written, concurrently by the nodes in the cluster or sequentially by the nodes in the cluster. That is, shared storage device 140 is configured to grant shared access to shared data 142 to multiple nodes (e.g., the applications running on the nodes) or exclusive access to shared data 142 to a single node, e.g., node 110.

Tracking structure 144 includes information identifying one or more items of data in data 142 that have been updated while a cache recovery operation is being performed. In one embodiment, tracking structure 144 includes a list of blocks that were been updated during a cache recovery operation. In another embodiment, tracking structure 144 is implemented as a bitmap.

Cache information 146 includes information that identifies the state of write-back caching in the cluster. For example, cache information 146 can indicate that write-back caching is enabled for one or more nodes in the cluster, as well as information identifying the one or more nodes, such as a name and/or address of a node. Cache information 146 can also include information indicating the write-back caching is disabled for one or more nodes in the cluster. Cache information 146 can also include information that indicates that a cache recovery operation is in progress, e.g., that data is being flushed from a local cache on one of the nodes to shared data 142.

Global cache ID 148 is configured to be used to prevent stale local caches from being used by the nodes in the cluster. In response to a node comparing the node's local cache ID with global cache ID 148 and detecting that the two do not match, the node determines that the data stored in the node's local cache may be stale and should not be used.

Node 110 includes an application 112. Application 112 can be a word processing program, email program, graphic editing program, database application, or the like. Application 110 accesses (e.g., by generating and/or consuming) shared data 142 on shared storage device 140. In one embodiment, multiple instances of application 112 are run on multiple nodes of the cluster. If node 110 crashes, or otherwise becomes unable to execute application 112, application 112 can be restarted, e.g., failed over, on another node in the cluster.

Node 110 also includes a cluster module 114, which includes cluster information 116. Cluster module 114 is configured to perform cluster management operations, such as joining the cluster, communicating with other nodes in the cluster, participating in selection of active and failover nodes, and the like. Cluster module 114 is also configured to generate and transmit messages to other nodes regarding the status of node 110, as well as receive and process such messages from the other nodes in the cluster. Cluster information 116 includes information identifying whether high availability is provided, e.g., by one or more failover nodes in the cluster. Cluster information 116 can also include information identifying the address and status of the other nodes in the cluster.

Node 110 also includes a local cache 120. In one embodiment, local cache 120 is implemented as a solid state drive (SSD). Local cache 120 is also configured to persistently store data, such that a loss of power to node 110 does not result in the loss of data stored in local cache 120. Local cache 120, in one embodiment, is implemented as a non-shared cache. That is, data stored in local cache 120 is not shared with, or accessible by, other nodes in the cluster. Local cache 120 includes data 122, local cache information 124, and a local cache ID 126. Local cache 120 is, in one embodiment, more readily accessible by application 112 than shared storage device 140. That is, application 112 can write data to local cache 120 and read data from local cache 120 more rapidly than application 112 could write data to or read data from shared storage device 140. This can be a function of local cache 120 being implemented using one or more faster devices than used in shared storage device 140 and/or local cache 120 being located physically closer and connected using a more high-speed connection than shared storage device 140.

While local cache 120 is shown included in node 110, local cache 120 can be implemented as an external storage device connected, e.g., via bus or other interconnect to node 110. Local cache 120 is configured to provide persistent storage. Local cache 120 should be relatively fast, e.g., compared to shared storage device 140. In one embodiment, local cache 120 is implemented as a PCI card that includes a SSD. The PCI card is coupled to node 110.

Data 122 includes data that is accessed, e.g., read and/or written, by application 112. Data 122 includes data that is cached rather than written to shared storage device 140. Performance of application 112 can be improved by processing application 112's read and write operation using data stored in data 122, rather than using data stored in shared storage device 140.

Local cache information 124 is configured to include information that identifies data that has been written to data 122. Such data can include read data, e.g., data that is read from shared storage device 140 and written to data 122 for faster access in the future, as well as write data, e.g., data that is written by application 112 and is not yet stored in shared storage device 140. Local cache information 124 includes information that differentiates which data (e.g., on a block by block basis) is read data and which data is write data. In one embodiment, local cache information 124 also includes information identifying whether the data has been replicated to one more failover nodes, and which failover nodes the data has been replicated to. In one embodiment, local cache information 124 includes a cache table that includes the address in local cache 120 where each piece of data is stored, as well as a corresponding address in shared storage device 140.

Local cache ID 126 is configured to be used to prevent the use of stale cached data. Node 110 is configured to compare local cache ID 126 with global cache ID 148 to determine whether local cache 120 is stale or not. Node 110 detects that local cache 120 is stale in response to comparing local cache ID 126 and global cache ID 148, and detecting that the two are not the same value.

Node 110 also includes a cache module 118. Cache module 118 is configured to detect whether write back caching is, or should be, allowed on node 110. In one embodiment, cache module 118 accesses configuration information (not shown) to detect one or more settings indicating when write-back caching is allowed. For example, cache module 118 can be configured to use write-back caching whenever node 110 is the active node. In response to detecting that node 110 is reconfigured as a failover node, cache module 118 can disallow write-back caching on node 110. In one embodiment, cache module 118 allows write-back caching based on whether there is at least one failover node configured in the cluster. For example, cache module 118 can access cluster information 116 and detect whether the cluster includes any failover nodes. If, for example, cache module 118 detects that node 110 is configured as an active node, and that no failover nodes are configured in the cluster, cache module 118 can disallow write-back caching.

In the event that write back caching is allowed, cache module 118 is configured to write data to local cache 120 and read data from local cache 120. In one embodiment, cache module 118 detects a write operation, e.g., in response to application 112 requesting that data be written to a specified address. The write request includes the data to be written and the address to which the data is to be written. In one embodiment, the address specifies a location in shared storage device 140. In response to detecting the write, cache module 118 writes the data to a corresponding address in local cache 120. The data is not written to shared storage device 140 at this time. Instead, the corresponding address is mapped to a corresponding location in shared storage device 140. Cache module 118 is also configured to update a cache table, such as can be stored in local cache information 124, to indicate that data that corresponds to the specified address in shared storage device 140 can be found at the corresponding address in local cache 120.

In one embodiment, cache module 118 detects whether a write has already been received, e.g., from application 112, that specified the same address in shared storage device 140. This involves accessing cache information, such as a cache table stored in local cache information 124. If the address has already been written to, cache module 118 can overwrite the data stored at the address in local cache 120.

Cache module 118 is also configured to process reads using local cache 120. In one embodiment, application 112 requests that data be read from a specified address in shared storage device 140. Cache module 118 is configured to detect whether the data is available in local cache 120, e.g., by searching local cache information 124 to detect whether the specified address is found in a cache table stored therein. If the specified address is found in the cache table, cache module 118 is configured to read the data from a corresponding address in local cache 120.

In one embodiment, cache module 118 is also responsible for replicating any data written to local cache 120, e.g., application writes, or dirty blocks, to any other available local caches stored on failover nodes in the cluster. In response to detecting a write to local cache 120, cache module 118 is configured to detect whether any failover nodes are configured in the cluster. This can involve accessing cluster information 116. If cache module 118 detects failover nodes in the cluster, cache module 118 replicates the data written to cache 120 to the failover nodes. The failover nodes receive the data, store the data in their own local caches, and update their local cache tables.

Cache module 118 is configured to selectively replicate cache data to one or more of a plurality of failover nodes. For example, cache module 118 is configured to detect that the data should only be replicated to a specific number of failover nodes. In one embodiment cache module accesses a resiliency specification parameter that identifies the number of failures that should be tolerated and replicates the data to the specified number of failover nodes. In another embodiment, cache module 118 detects that not all of the failover nodes allow write-back caching, and cache module 118 replicates the data to only those nodes that allow write-back caching.

Cache module 118 is also configured to update write-back caching status information on shared storage device 140 to indicate that write-back caching is enabled and is ongoing on node 110. In one embodiment, cache module 118 updates information in cache information 146 to indicate that node 110 has enabled write-back caching. Cache module 118 can transmit an update that include an address for node 110 and a flag value indicating that write-back caching is enabled (allowed) on node 110.

Cache module 118 is also configured to update local cache ID 126 and global cache ID 148. As discussed further with regard to FIGS. 3 and 4, cache module 118 is configured to update these values in response to detecting the occurrence of certain events. For example, during an initial set up of the cluster, cache module 118 is configured to set the local cache ID of any nodes in the cluster and the global cache ID to the same value.

Cache module 118 is also configured to flush data from local cache 120 to shared storage device 140. For example, in response to detecting that local cache 120 is full, cache module 118 is configured to transfer some or all of the data stored in local cache 120 to shared storage device 140, thus freeing up additional space in local cache 120. In one embodiment, cache module 118 selectively flushes data using, e.g., a least recently used algorithm. Cache module 118 is also configured to flush data from local cache 120 to shared storage device 140 periodically, e.g., in response to detecting an event such as expiration of a specified time period. In one embodiment, cache module 118 is configured to flush data from local cache 120 to shared storage device 140 in response to detecting that write-back caching is to be disabled (disallowed). In one embodiment, when caching module 118 flushes dirty data from node 110 it also communicates with caching module 158 on node 150 to mark the corresponding local cache block entries as non-dirty. This will avoid redundant flushes from node 150

The cluster of FIG. 1 also includes node 150. Node 150 includes corresponding elements to node 110, such that in response to detecting that node 110 has failed, node 150 is configured to assume the role of active node and resume the operations previously performed by node 110.

As shown, node 150 includes an application 152. Application 152 can be a word processing program, email program, graphic editing program, database application, or the like. In one embodiment, application 152 and application 112 are both instances of the same application.

As shown, node 150 also includes a cluster module 154, which includes cluster information 156. Cluster module 154 is configured to perform cluster operations, such as failover. Cluster information 156 includes information identifying the nodes of the cluster, and their respective roles, e.g., active node or failover node.

Also shown is local cache 160, which includes data 162, local cache information 164, and local cache ID 166. Data 162 includes data that can be accessed, e.g., read and/or written, by application 152. Local cache information 164 includes information identifying which blocks in data 162 have been written, e.g., by application 152 or from node 110's application 152, and whether those blocks have been replicated to any other nodes. In one embodiment, local cache information 164 includes a cache table. The cache table is comprised of entries, each entry including an address in shared storage device 140 and a corresponding address in local cache 160.

Node 150 also includes a cache module 158. Cache module 158 can be used to enable or disable write back caching for node 150. Cache module 158 is also configured to detect whether data stored in local cache 160 is stale or not. In one embodiment, cache module 158 compares local cache ID 166 with global cache ID 148. If the two are not the same, cache module 158 detects that local cache 160 contains stale data.

Figure 2:
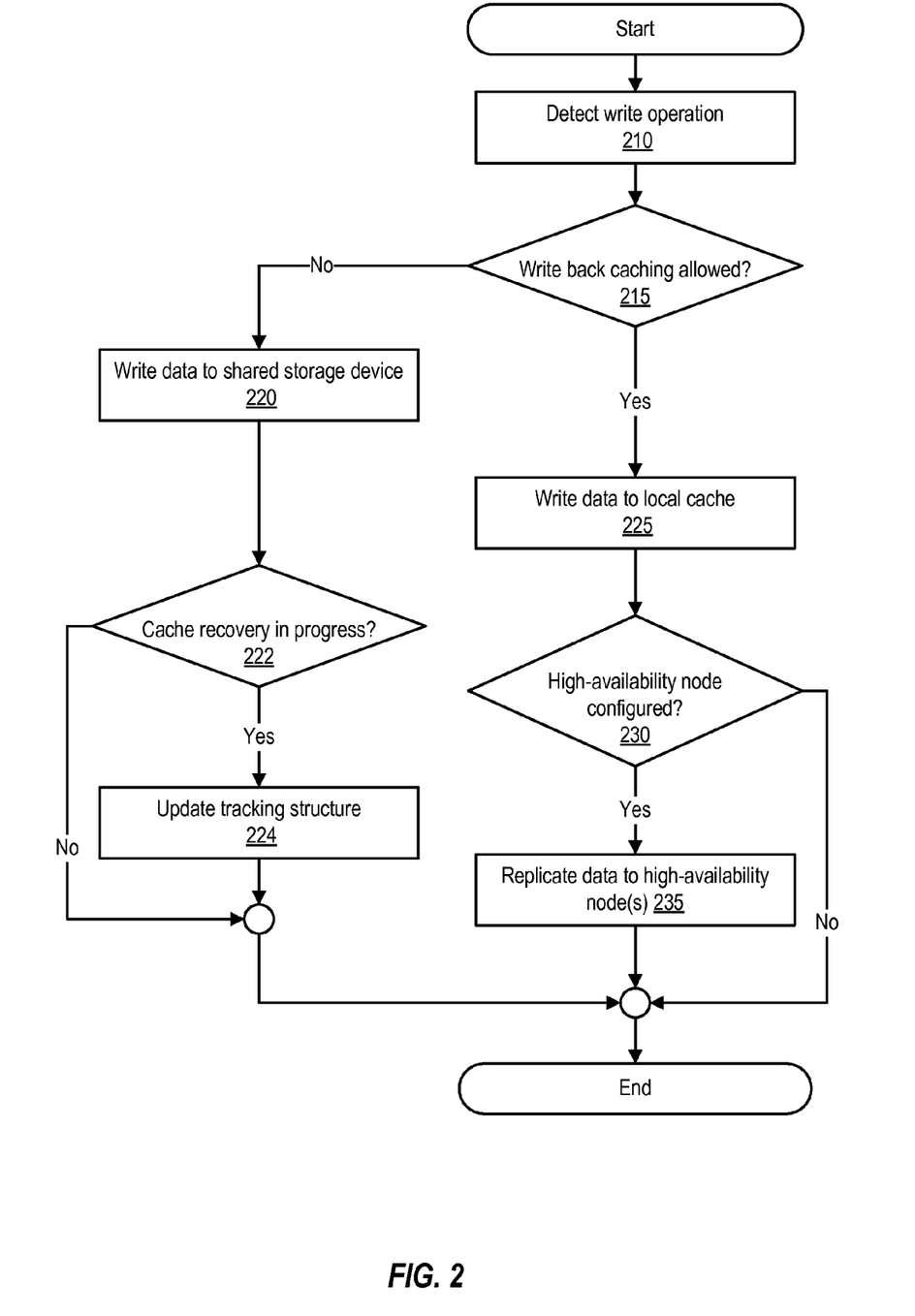
FIG. 2 is a flowchart of a method of executing a write operation using write-back caching in a cluster environment, according to one embodiment of the present invention.

FIG. 2 is a flowchart of a method of performing a write operation in a cluster environment that is configured to use write back caching. The method can be performed by a cache module, such as cache module 118 of FIG. 1. In one embodiment, the method is used to support cluster-aware write-back caching using a non-shared local cache devices in clustered environments and/or non-clustered environments. In a cluster environment, a shared storage device is exclusively accessed by an application on an active node. Other nodes in the cluster are configured as failover nodes. On the active node, all dirty data blocks are tracked using a circular metadata log (CML) stored on the local cache. The dirty data blocks are replicated to all the configured failover nodes' local caches and are written to the local cache on the active node as well. This facilitates application high-availability with updated write-back cached data. This also helps provide instant application online on the failover node after a graceful switch-over using the cached dirty data blocks present in the failover node's local cache.

The method begins at 210, in response to the cache module detecting a write operation. For example, an application, such as application 112 of FIG. 1, generates a write operation. The write operation includes information that identifies the data that is to be written, or the data itself, and an address to which the data is to be written, such as an address in a shared storage device, such as shared storage device 140 of FIG. 1.

At 215, the cache module detects whether write-back caching is allowed. In one embodiment, the cache module accesses node configuration information, such as can be stored in cluster information 116 of FIG. 1, to detect whether write back caching is allowed. For example, a user, such as an administrator, can specify that write back caching is to be used for a node, such as node 110 of FIG. 1. In one embodiment, the user specifies whether write-back caching is enabled for a node by setting a flag or other configuration variable. In this embodiment, the cache module can read the flag value to determine whether write-back caching is allowed for the node. In another embodiment, the configuration information can indicate that write back caching is allowed for the node only when at least one failover node, such as node 150 of FIG. 1, is present in the cluster. In this embodiment, cache module 118 can access cluster information to determine whether a failover node is present. Based on the configuration information, and whether a failover node is present or not, the cache module determines whether write-back caching is allowed for the node.

In response to detecting that write back caching is not allowed for the node, the cache module allows the write operation to proceed by writing, at 220, the data to a target storage device, such as shared data 142 of shared storage 140 of FIG. 1. After writing the data to the shared storage device, the cache module detects, at 222, whether a cache recovery operation is in progress. In one embodiment, a cache recovery operation is initiated by the cache module in response to detecting that write-back caching is disallowed. If a cache recovery operation is in progress, the cache module updates, at 224, a tracking structure, such as tracking structure 144 of FIG. 1.

If the cache module detects at 215 that write-back caching is allowed, the cache module writes the data to a local cache, such as local cache 120 of FIG. 1, at 225. In one embodiment, the cache module also updates cache information, such as local cache information 124 of FIG. 1. The cache information includes, in one embodiment, a cache table comprised of entries that each include an address in the shared storage device and a corresponding address in the local cache. The cache module detects whether an entry is found in the cache table that includes the address specified in the write operation. If so, the cache module updates metadata indicating the time the corresponding data was updated, the application that requested the write, and the like. If no entry is found, the cache module creates an entry. The entry includes the target address (e.g., the address in the shared storage device that was specified by the application in the write request) and the address in the local cache where the data is written.

At 230, the cache module detects whether one or more high availability nodes are configured. In one embodiment, this involves accessing cluster information maintained by a cluster module. If the cache module detects that one or more failover nodes are present in the cluster, the cache module replicates the written data to the one or more failover nodes at 235. In one embodiment, this involves accessing configuration information, not shown, to detect a resiliency parameter value. The resiliency parameter is specified by a user, and indicates how many node failures the cluster should be able to tolerate and still provide high-availability functionality. Based on the resiliency parameter value, the cache module determines how many failover nodes the data should be replicated to. For example, if the resiliency parameter value indicates that two (n) node failures should be tolerated, the cluster should contain three (n+1) copies of the data to ensure high-availability. The cache module calculates the number of failover nodes to replicate the data to, selects the failover nodes, and transmits the data to the failover nodes. In one embodiment, the cache module transmits the data to all failover nodes in the cluster. In response to receiving the data, the failover nodes store the data in their own local caches and update their own local cache information (e.g., cache tables).

Figure 3:
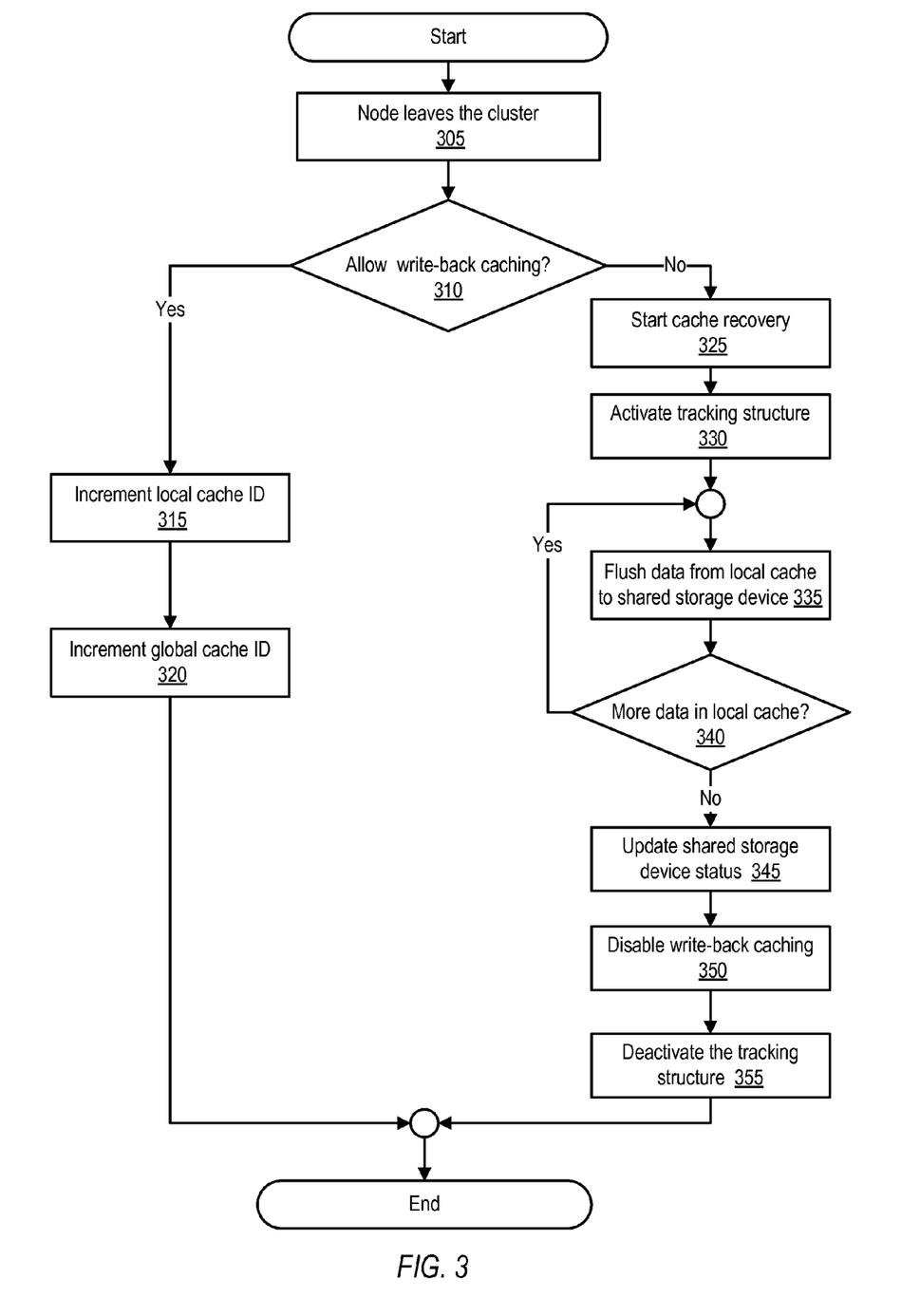
FIG. 3 is a flowchart of a method of a node leaving a cluster configured to use write-back caching, according to one embodiment of the present invention.

FIG. 3 is a flowchart of a method of preventing the use of stale caches after a node leaves a cluster configured to allow write back caching. The method can be performed by a cache module, such as cache module 118 of FIG. 1.

At 305, the cache module detects that a node, such as node 150 of FIG. 1, leaves the cluster. In one embodiment, the cache module detects that a node has left the cluster in response to the node on which the cache module resides, such as node 110 of FIG. 1, being reconfigured from a failover node to an active node. In another embodiment, the cache module detects that a heartbeat signal has terminated. In still another embodiment, the cache module receives updated cluster information, such as cluster information 116 of FIG. 1, that indicates that a node has left the cluster. The updates can be obtained, for example, in response to the cache module periodically checking the cache information, or in response to a cluster module detecting a change in the cluster that results in a change to the cache information. In the first case, during one of the periodic checks, the cache module detects that the cluster information has been updated to reflect that the node has left the cluster.

At 310, the cache module detects whether to allow write back caching on the node the cache module resides upon. In one embodiment, detecting whether to allow write-back caching involves the cache module detecting whether or not the node on which the cache module resides is the only node in the cluster. One example of the node being the only node in the cluster is if the cluster was a two node cluster comprising an active node and a failover node, and the active node failed, leaving only the failover node, which was then promoted to active node.

If the node is the only node in the cluster, the node is unable to replicate data stored in local cache, e.g., local cache 120 of FIG. 1, to a failover node. In this case, high availability functionality may be compromised. That is, if the node fails, there is no other node to immediately fail over to. Any node that joins subsequent to the node failing (thus becoming the only node in the cluster) will be unable to access the data stored in the local cache, and applications may use stale data, e.g., data that was updated by the application, but stored only in the cache of a failed node, not having been flushed to the shared storage device prior to the failed node going down.

In one embodiment, in response to the cache module detecting that the node is the last node in the cluster, the cache module determines that write back caching will no longer be allowed. In another embodiment, multiple nodes may be present in the cluster, but the node may be unable to communicate with the nodes due to split brain, the nodes may not be configured as failover nodes, or the nodes may be unable to perform write-back caching. In this case, e.g., when all except one of the configured nodes of the cluster are down, the cache module can trigger a cache recovery operation. In one embodiment, the last remaining node is configured as an active node. Alternatively, the last remaining node can be configured as a failover node. In either case, the last remaining node has access to a shared storage device, such as shared storage device 140 of FIG. 1. During the cache recovery operation, the shared storage device remains online and usable by applications, such as application 112 of FIG. 1, on the last remaining node. Write-back caching will be disabled as there are no nodes in the cluster to replicate the write back data.

A variable is used to track the recovery state of the shared storage device. A copy of the variable is maintained in the shared storage device, e.g., in a database stored in cache information, such as cache information 146 of FIG. 1.

Based on the conditions of the cluster, and configuration information, the cache module detects whether to allow write-back caching. In one embodiment, the cache module can be allowed to use write-back caching without high-availability, e.g., if the node is the only node in the cluster. If the cache module detects that write-back caching will be allowed at 310, the cache module increments a local cache ID, such as local cache ID 126 of FIG. 1, at 315. In response to detecting that additional nodes are present in the cluster, the cache module sends a message to the additional nodes indicating that the additional nodes should also update their copies of their local cache IDs to match the new local cache ID, which can be included in the message.

At 320, the cache module increments a global cache ID, such as global cache ID 148 of FIG. 1. In one embodiment, the cache module causes the global cache ID to be set to the same value as the local cache ID.

In response to detecting (at 310) that write back caching will not be allowed, the cache module begins a cache recovery process at 325. The cache recovery process involves copying some or all of the data, e.g., the dirty blocks, from the local cache, such as data 122 of FIG. 1, to a shared storage device, such as shared data 142 of shared storage 140 of FIG. 1. In one embodiment starting the cache recovery involves the cache module setting a flag value, e.g., in cache information 146 of FIG. 1, which indicates that the cache is being flushed. Nodes that join the cluster can check the flag value to detect whether a recovery operation is in progress, or if a failure occurred while a recovery operation was in progress such that the recovery operation failed to complete.

The cache module activates a tracking structure at 330. In one embodiment, the tracking structure includes a list of blocks that are modified after the cache recovery operation is initiated and before the cache recovery operation is completed. For example, the tracking structure can include information that identifies blocks of the shared storage that are modified by an application, such as application 112 of FIG. 1, on the shared storage directly. The tracking structure can also include information that identifies blocks which are flushed from local cache to shared storage. While a cache recovery operation is in progress, the flush operation will be skipped for the blocks which are marked in the DCO to avoid overwriting the latest data.

In one embodiment, the tracking structure is implemented as a data change object (DCO). The DCO is associated with all or a portion of the shared storage device. For example, the shared storage device can include multiple volumes, with each volume being associated with different nodes. A DCO can be associated with each volume that is being recovered. In one embodiment, the DCO is stored in the shared storage device and is used to track the recovered and modified blocks during recovery. During a cache recovery option, blocks in the shared storage device can be modified in the following cases: after cache data is flushed to the blocks; prior to cache data being flushed to the blocks, e.g., the cache module still intends to flush cache data to the blocks. If the cache recovery operation is aborted, e.g., due to the last remaining node failing during the cache recovery operation, and resumed from another node, e.g., in response to a node joining (or rejoining) the cluster and detecting that a cache recovery operation was in progress but failed to complete, e.g., by accessing the cache status variable, then the cache module on the joining node uses the DCO to skip flushing the blocks that correspond to blocks that have already been flushed or were modified on the shared storage device. In response to detecting completion of the cache recovery operation, the cache module deactivates the DCO.

At 335, the cache module flushes a first item of data from the local cache to the shared storage device. In one embodiment, the cache module also updates a dirty block list, such as a log, or bitmap, that includes information that identifies which blocks in the cache have been flushed and which blocks have not. At 340, the cache module detects whether there is additional data in the local cache which has not yet been flushed to the shared storage device. The cache module can use the dirty block list to detect whether all blocks in the local cache have been flushed or not. If additional data remains in the local cache to be flushed, the method returns to 340 where the cache module selects the next item of data to be flushed from the local cache to the shared storage device.

Once all the data stored in the local cache is flushed from the local cache to the shared storage device, the cache module updates status information for the shared storage device, at 345. The cache module clears the flag that indicates that a cache recovery operation is in progress. In one embodiment, the cache module also increments a global cache identifier, such as global cache identifier 148 of FIG. 1 and a local cache identifier, such as local cache ID 126 of FIG. 1. As a result of incrementing the global cache ID, any joining node that joins the cluster subsequently will have local cache ID values that do not match the global cache ID. In response to detecting the mismatch, a cache module on a joining node detects that the data in the joining node's local cache is not valid.

At 350, the cache module disables write back caching. In one embodiment, this involves the cache module updating information, such as cluster information 116 of FIG. 1, to indicate that write back caching is no longer allowed for the node. In one embodiment, the cache module updates cache information stored on the shared storage device to indicate that write-back caching is disabled. As a result of disabling write-back caching, any joining node that joins the cluster subsequently detects that write-back caching is not enabled. In response to the detecting, a cache module on the joining node detects that the data in the joining node's local cache is not valid.

At 355, the cache module de-activates the tracking structure. In response to detecting the tracking structure is not enabled, information identifying the target blocks of the shared storage device during subsequent writes is not recorded in the tracking structure.

Figure 4:
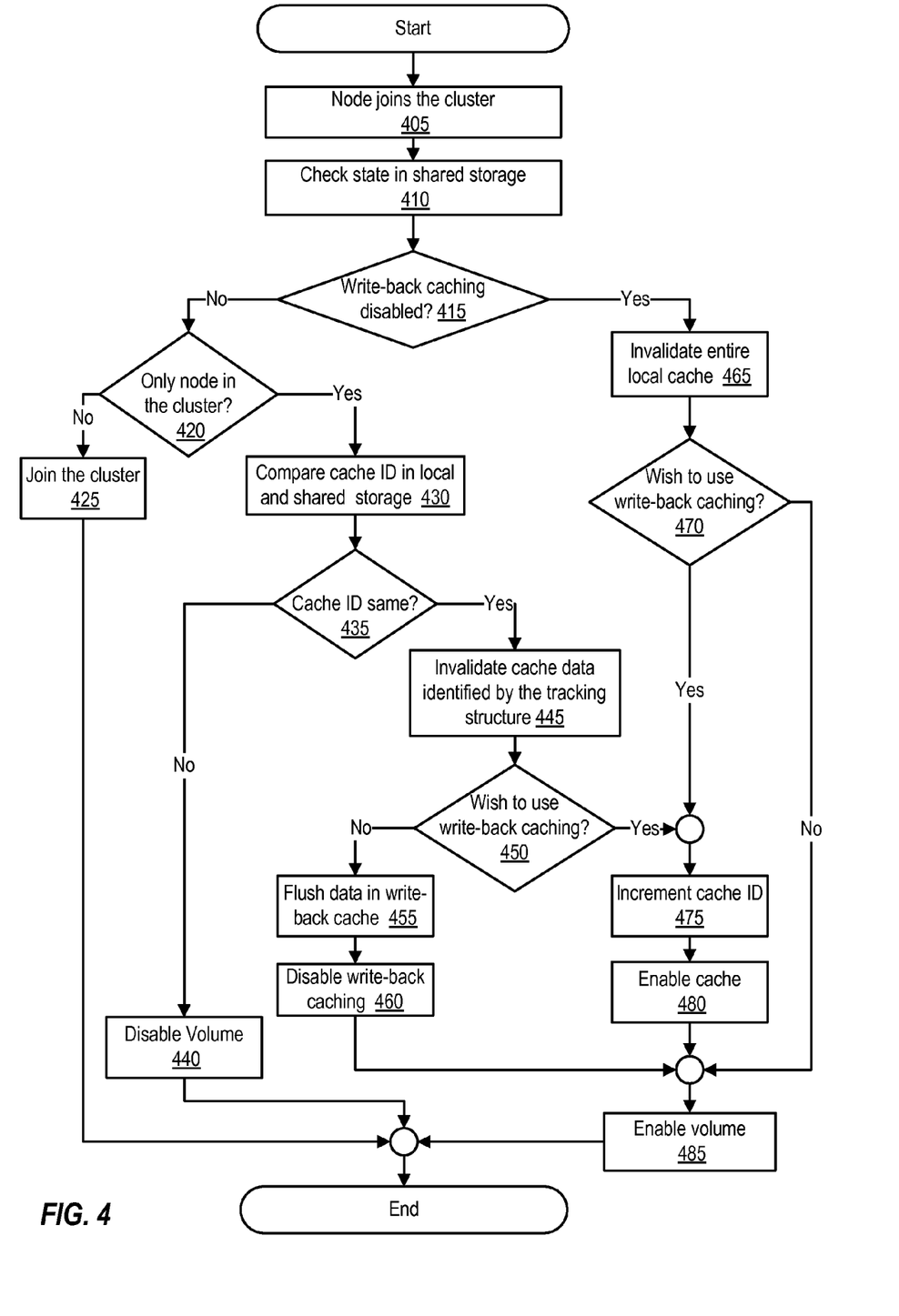
FIG. 4 is a flowchart of a method of a node joining a cluster configured to use write-back caching, according to one embodiment of the present invention.

FIG. 4 is flowchart of a method of a node joining a cluster, where the cluster is configured to allow write back caching. The method can be performed by a cache module, such as cache module 118 of FIG. 1.

At 405, a node, such as node 110 of FIG. 1, joins the cluster. In one embodiment, the node performs a startup procedure that includes identifying any other cluster resources present in the cluster, such as other nodes and/or shared resources, such as shared storage device 140.

At 410, the cache module checks the state of the shared storage device. In one embodiment, this involves the cache module determining whether write-back caching is enabled or disabled, and/or whether a cache recovery operation is in progress. The cache module accesses cache information, such as cache information 146 of FIG. 1, to detect the information At 415, the cache module detects whether write back caching is enabled (allowed) or disabled (not allowed). If write-back caching is not disabled, the cache module detects either that a node that was previously a member of the cluster and was configured as an active node failed during a cache recovery process, or that write-back caching is currently enabled in the cluster, e.g., that write-back caching is currently being performed by other nodes in the cluster.

If, at 420, the cache module detects that the node on which the cache module resides is not the only node in the cluster, the node joins the cluster at 425. In one embodiment, node joining the cluster involves performing various cache operations. For example, the cache module synchronizes the local cache, such as local cache 120 of FIG. 1, with the local cache of one or more other nodes already present in the cluster. Synchronizing the local cache means confirming that the data, including dirty data, such as data 122 of FIG. 1, and cache table, such as is stored in local cache information 124 of FIG. 1, in the local cache matches the data stored in the local cache of one of the other nodes. If the cache data and cache tables do not match, the node copies or requests that the cache data and cache table information be copied from the nodes already in the cluster. The cache module also sets the local cache ID, such as local cache ID 126 of FIG. 1, as equal to the local cache ID of the other nodes. Additionally, the cache module updates cluster information included on the node to indicate that the node is joining the cluster as a failover node.

On the other hand, if the cache module detects at 420 that the node is the only node in the cluster, the method proceeds to 430, where the cache module compares the local cache ID with the global cache ID, such as global cache ID 148 of FIG. 1. If the cache module detects that the cache IDs are not the same, the cache module disables the volume at 440. In one embodiment, this means that the cache module will not allow an application executing on the node, such as application 112 of FIG. 1, access to data stored in the shared storage. In this case, the node can notify a user that an error has occurred that may warrant user intervention.

Detecting that the node is the only node in the cluster but the local cache ID of the node is not the same as the global cache ID indicates that the data stored in the local cache is stale. In one embodiment, this occurs as follows. Consider a two-node cluster having an active node 1, a failover node 2, and a shared storage device. Each of the nodes has an instance of application 1 installed, and write-back caching is enabled. In response to detecting that node 1 goes down, node 2 takes over as active node and application 1 continues executing seamlessly. Node 2 decides to continue write-back caching, so node 2 updates its local cache ID and the global cache ID. Subsequently, node 2 fails, which means that any data stored in node 2's cache is now unavailable. Node 1 rejoins the cluster as the only node in cluster, and restarts application 1. Since node 1's local cache does not have the most recent cached data, and node 2 is down, meaning node 1 cannot synchronize with node 2, if application 1 resumes operations errors are likely, since the most recent data was not flushed to the shared storage device before node 2 crashed. However, since node 1 detects that node 1's local cache ID does not match the global cache ID, node 1 detects this problem and does not enable application 1 on the shared storage device.

If at 435, the cache module detects that the local cache ID is the same as the global cache ID, the method proceeds to 445, where the cache module invalidates cache data identified by the tracking structure. In one embodiment, this involves the cache module accessing the tracking structure, such as tracking structure 144 of FIG. 1, to identify one or more blocks that were modified in the shared storage while a cache recovery process was ongoing. If the blocks identified by the tracking structure is having been modified are also included in the local cache, the local cache data should not be used, as the data stored in the shared storage device is more recent. In one embodiment, the tracking structure can be copied from the shared storage device to the node. The data can be invalidated iteratively, up front. In another embodiment, the cache module checks the tracking structure in response to detecting a read operation, and if the read operation implicates data identified by the tracking structure, the cache module serves the read from the shared storage device and copies the data from the shared storage device to the local cache. The cache module updates the tracking structure, removing information that identifies each data item, e.g., block, that is invalidated until the cache module detects that the tracking structure is empty.

At 450, the cache module determines whether or not to use write back caching. In one embodiment, this involves checking a configuration parameter. For example, the node can be configured to disallow the use of write-back caching if the node is the only node in the cluster. The cache module can detect this setting, and based on the setting and detecting that the node is the only node in the cluster, the cache module can disallow write-back caching for the node.

If, at 450, the cache module determines that write back caching will not be used, the cache module flushes the data in the write back cache to the shared storage device at 455. The data that is flushed does not include any data that corresponds to data that was indicated as being invalid by the tracking structure. Since that data is more recent in the shared storage device than in the local cache, the data is not flushed from the local cache to the shared storage device.

At 460, the cache module disables write back caching. In one embodiment, this involves the cache module updating information, such as cluster information 116 of FIG. 1, to indicate that write back caching is not allowed for the node. As a result of disabling write-back caching, any joining node that joins the cluster subsequently detects that write-back caching is not enabled. In response to the detecting, a cache module on the joining node detects that the data in the joining node's local cache is not valid.

Returning to 415, if the cache module detects that write-back caching is disabled, the cache module invalidates the entire local cache at 465. In one embodiment, the fact that write-back caching is not allowed indicates that a cache recovery operation has completed successfully. In this case, the shared storage device has the most recently updated data. That is, updates previously cached have been completely flushed from local cache to the shared storage device.

At 470, the cache module detects whether to use write back caching. In one embodiment, the cache module accesses cluster information and detects parameters set up that determine whether write-back caching is allowed. Based on whether the cache module detects that the parameters are satisfied, the cache module determines whether to allow write-back caching.

If so, the cache module increments the local cache ID at 475. If the cache module detects multiple nodes present in the cluster, the cache module communicates with the other nodes and instructs the other nodes to set their local cache IDs to the same value as that of the node that includes the cache module. The cache module also updates the global cache ID to the same value.

At 480, the cache module enables the local cache. In one embodiment, this involves setting value in local cache information and/or setting a value in cache information for the shared storage device. Subsequent to the setting the value(s), write back caching is allowed. That is, I/O operations that occur subsequent to setting the value(s) are serviced using the local cache. At 485, the cache module enables the volume. In one embodiment, this means that an application is allowed to perform read and write operations.

Figure 5:
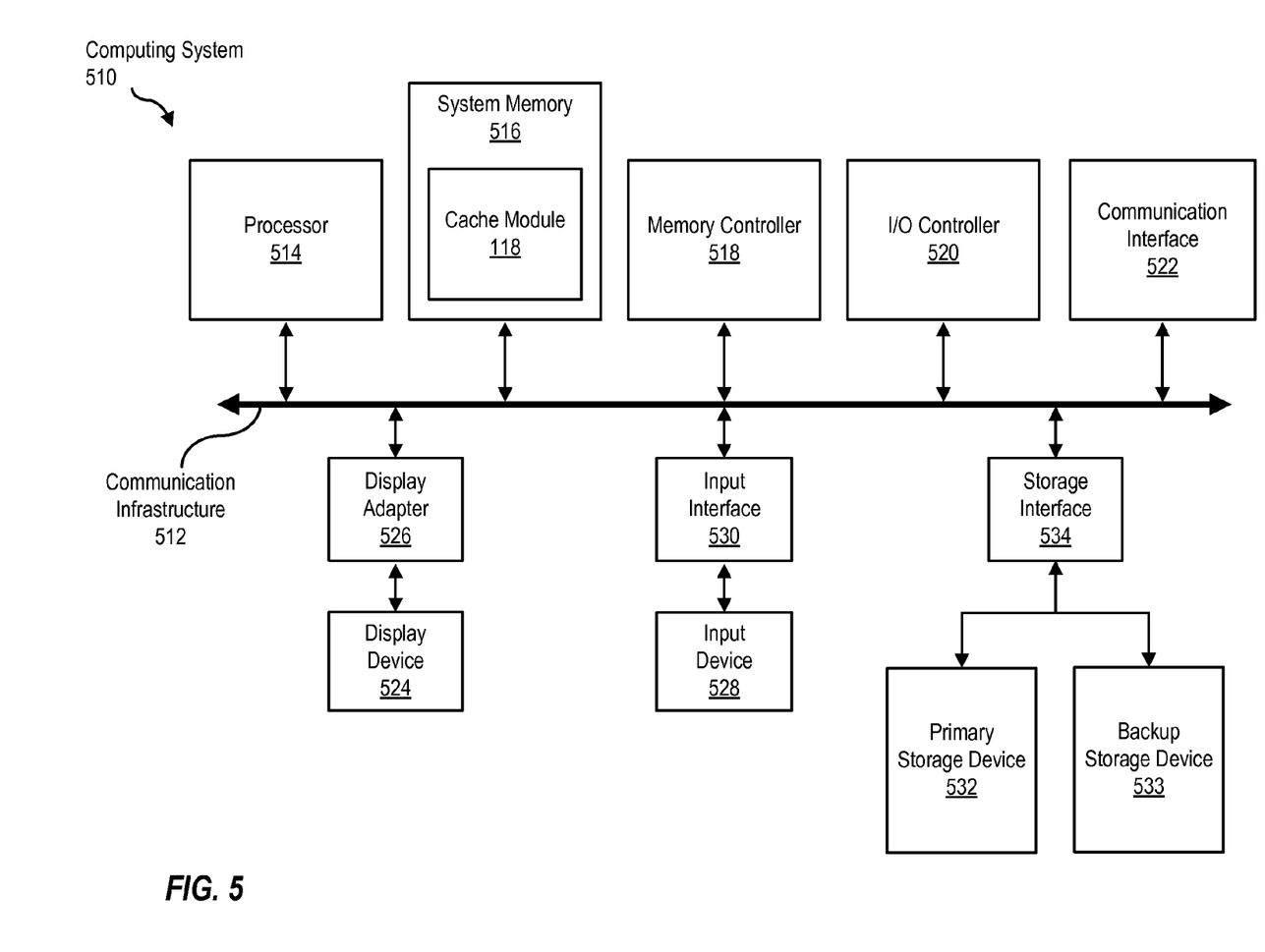
FIG. 5 is a block diagram of a computing device, illustrating how a cache module can be implemented in software, according to one embodiment of the present invention.

FIG. 5 is a block diagram of a computing system 510, capable of performing write-back caching in a cluster environment, as described above. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a cache module 118, computing system 510 becomes a special purpose computing device that is configured to perform write-back caching in the manner described above.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, program instructions executable to implement a cache module (e.g., as shown in FIG. 1) may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 5100, and storage interface 5104.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer) for display on display device 524.

As illustrated in FIG. 5, computing system 510 may also include at least one input device 528 coupled to communication infrastructure 512 via an input interface 530. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. A storage device like primary storage device 532 can store information such as full backup images, incremental backup images, and/or backup metadata.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
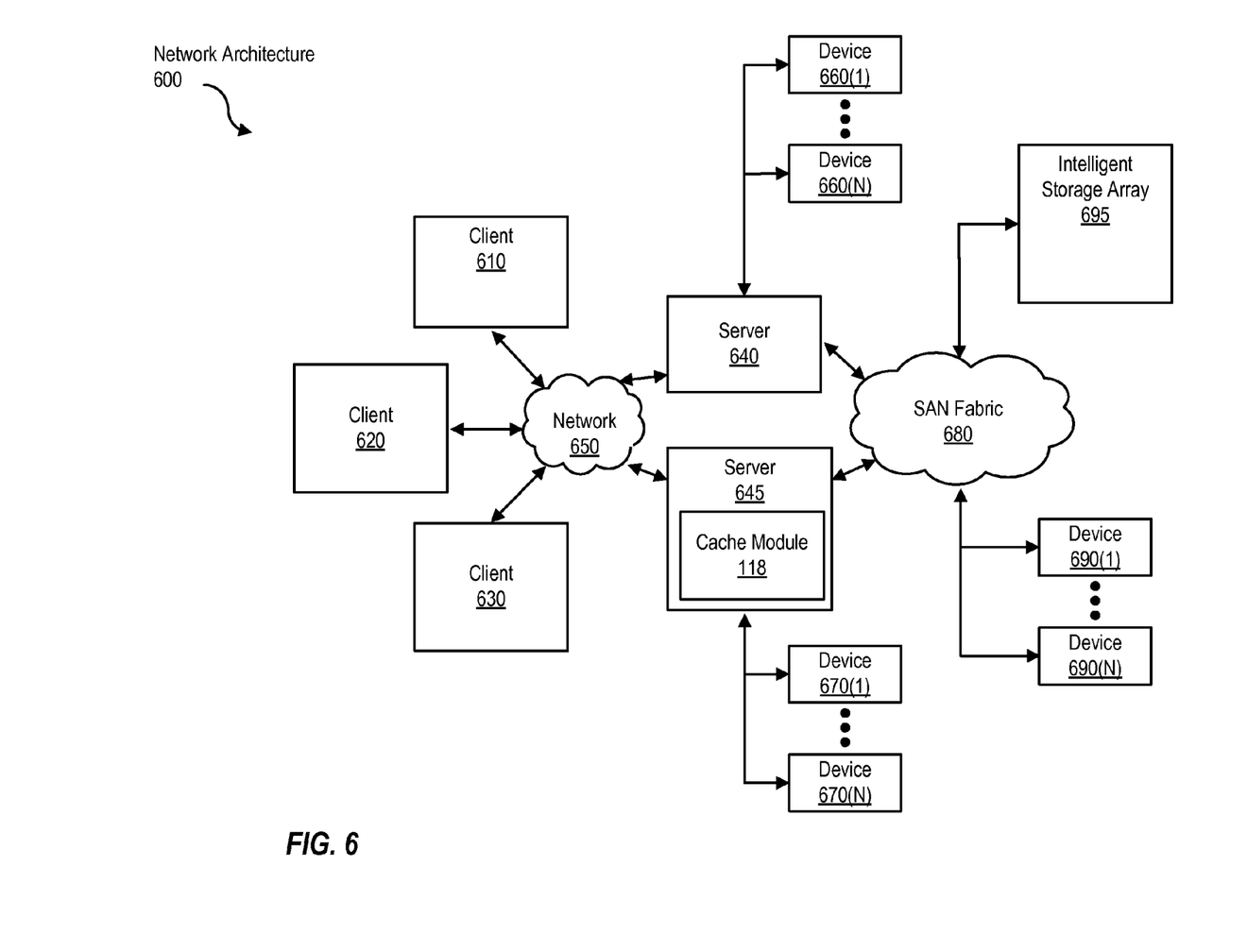
FIG. 6 is a block diagram of a networked system, illustrating how various computing devices can communicate via a network, according to one embodiment of the present invention.

FIG. 6 is a block diagram of a network architecture 600 in which client systems 610, 620, and 630 and servers 640 and 645 may be coupled to a network 650. Client systems 610, 620, and 630 generally represent any type or form of computing device or system, such as computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, one or more of client systems 610, 620, and/or 630 may include a cache module 118 as shown in FIG. 1.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS). Such storage devices can store backup information and storage configuration information, as described above.

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660 (1)-(N), storage devices 670(1)-(N), storage devices 690(1)- (N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 640(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of one of the systems in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a cache module may transform the behavior of a cluster such that write-back caching is allowed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   a first node detecting that no failover nodes are available, wherein
      the first node comprises a local cache and a first local cache identifier,
      the first node is coupled to a shared storage device, and
      the shared storage device comprises a global cache identifier;
   determining whether to allow write-back caching on the first node, wherein
      the determining is performed in response to the detecting; and
   if write-back caching is allowed on the first node, incrementing the first local cache identifier and the global cache identifier.

2. The method of claim 1, further comprising:
   performing a cache recovery operation in response to detecting that write-back caching is disallowed on the first node.

3. The method of claim 2, wherein the performing comprises:
   copying data from the local cache to the shared storage device;
   preventing further data modifications from being stored in the local cache; and
   updating a tracking structure to include information that identifies data modified during the recovery operation.

4. The method of claim 2, further comprising:
   updating cache status information to indicate that write-back caching is disallowed for the shared storage device, wherein
      the updating is performed in response to determining that all data in the local cache is copied to the shared storage device; and
   joining a second node to a cluster, wherein
      the second node comprises a second local cache and a second local cache identifier.

5. The method of claim 4, further comprising:
   invalidating contents of the second local cache, wherein the invalidating is performed in response to detecting that write-back caching is disallowed for the shared storage device.

6. The method of claim 4, further comprising:
comparing the second local cache identifier with the global cache identifier; and
invalidating contents of the second local cache, wherein
the invalidating is performed in response to detecting that there is a mismatch between the second local cache identifier and the global cache identifier.

7. The method of claim 4, further comprising:
determining whether write-back caching is allowed on the second node;
incrementing the second local cache identifier, wherein
the incrementing is performed in response to determining that write-back caching is allowed on the second node.

8. The method of claim 2, further comprising:
detecting that the first node has failed, wherein
the first node failed prior to completion of the recovery operation; and
joining a second node to a cluster, wherein
the second node comprises a second local cache and a second local cache identifier.

9. The method of claim 8, further comprising:
detecting that contents of the second local cache are valid, except for data modified during the recovery operation, wherein
the detecting that contents of the second local cache are valid comprises accessing a tracking structure that includes information that identifies the data modified during the recovery operation.

10. A non-transitory computer readable storage medium storing program instructions executable to:
detect that no failover nodes are available, wherein
detecting that no failover nodes are available is performed by a first node,
the first node comprises a local cache and a first local cache identifier,
the first node is coupled to a shared storage device, and
the shared storage device comprises a global cache identifier;
determine whether to allow write-back caching on the first node, wherein
determining whether to allow write-back caching on the first node is performed in response to detecting that no failover nodes are available; and
if write-back caching is allowed on the first node, increment the first local cache identifier and the global cache identifier.

11. The non-transitory computer readable storage medium of claim 10, wherein the instructions are further executable to:
perform a cache recovery operation in response to detecting that write-back caching is disallowed on the first node.

12. The non-transitory computer readable storage medium of claim 11, wherein the instructions are further executable to:
update cache status information to indicate that write-back caching is disallowed for the shared storage device, wherein
updating the cache status information is performed in response to determining that all data in the local cache is copied to the shared storage device; and
join a second node to a cluster, wherein
the second node comprises a second local cache and a second local cache identifier.

13. The non-transitory computer readable storage medium of claim 12, wherein the instructions are further executable to:
determine whether write-back caching is allowed on the second node;
increment the second local cache identifier in response to determining that write-back caching is allowed on the second node.

14. The non-transitory computer readable storage medium of claim 12, wherein the instructions are further executable to:
compare the second local cache identifier with the global cache identifier; and
invalidate contents of the second local cache, wherein
invalidating contents of the second local cache is performed in response to detecting that there is a mismatch between the second local cache identifier and the global cache identifier.

15. The non-transitory computer readable storage medium of claim 12, wherein the instructions are further executable to:
detect that contents of the second local cache are valid, except for data modified during the recovery operation, wherein
detecting that contents of the second local cache are valid comprises accessing a tracking structure that includes information that identifies the data modified during the recovery operation.

16. A system comprising:
one or more processors; and
a memory coupled to the one or more processors, wherein the memory stores program instructions executable by the one or more processors to:
detect that no failover nodes are available, wherein
detecting that no failover nodes are available is performed by a first node,
the first node comprises a local cache and a first local cache identifier,
the first node is coupled to a shared storage device, and
the shared storage device comprises a global cache identifier;
determine whether to allow write-back caching on the first node, wherein
determining whether to allow write-back caching on the first node is performed in response to detecting that no failover nodes are available; and
if write-back caching is allowed on the first node, increment the first local cache identifier and the global cache identifier.

17. The system of claim 16, wherein the instructions are further executable to:
perform a cache recovery operation in response to detecting that write-back caching is disallowed on the first node;
update cache status information to indicate that write-back caching is disallowed for the shared storage device, wherein
updating the cache status information is performed in response to determining that all data in the local cache is copied to the shared storage device; and
join a second node to a cluster, wherein
the second node comprises a second local cache and a second local cache identifier.

18. The system of claim 17, wherein the instructions are further executable to:

determine whether write-back caching is allowed on the second node;

increment the second local cache identifier in response to determining that write-back caching is allowed on the second node.

19. The system of claim 17, wherein the instructions are further executable to:

compare the second local cache identifier with the global cache identifier; and invalidate contents of the second local cache, wherein invalidating contents of the second local cache is performed in response to detecting that there is a mismatch between the second local cache identifier and the global cache identifier.

20. The system of claim 16, wherein the instructions are further executable to:

detect that contents of the second local cache are valid, except for data modified during the recovery operation, wherein detecting that contents of the second local cache are valid comprises accessing a tracking structure that includes information that identifies the data modified during the recovery operation.

* * * * *